United States Patent [19]

Mays

[11] Patent Number: 4,657,167

[45] Date of Patent: Apr. 14, 1987

[54] AUTOMATIC FASTENING MACHINE FOR ROOF AND DECK COVERINGS

[76] Inventor: Gary S. Mays, Box 245, Ashley, Ohio 43003

[21] Appl. No.: 691,926

[22] Filed: Jan. 16, 1985

[51] Int. Cl.$^4$ ............................................... B25C 7/00
[52] U.S. Cl. ...................................... 227/99; 227/110; 227/114; 227/119; 227/149; 81/431
[58] Field of Search ...................... 227/15, 18, 30, 39, 227/43, 48, 50, 99, 105, 107, 114, 116, 118, 120, 138, 140, 147, 149, 150; 29/798, 816; 81/431, 57.24, 57.25, 57.37; 221/264, 298

[56] References Cited

U.S. PATENT DOCUMENTS

| | | | |
|---|---|---|---|
| 1,262,486 | 4/1918 | Hansen | 227/147 |
| 2,886,815 | 5/1959 | Young | 227/120 |
| 3,542,243 | 11/1970 | Stockdale | 221/298 |
| 3,595,460 | 7/1971 | Pitkin | 227/130 X |
| 3,733,086 | 5/1973 | Walkeron | 221/298 X |
| 3,734,377 | 5/1973 | Munn | 227/120 |
| 3,796,365 | 3/1974 | Downing | 227/8 |
| 3,935,983 | 2/1976 | Buttriss | 227/120 X |
| 4,013,193 | 3/1977 | Lorsch | 221/264 |
| 4,033,499 | 7/1977 | Butler | 227/120 |
| 4,072,090 | 2/1978 | Heisler | 221/298 X |
| 4,091,850 | 5/1978 | Kjolsrud | 227/120 X |
| 4,091,963 | 5/1978 | Lorsch | 221/264 |
| 4,246,939 | 1/1981 | Boegel | 81/431 X |

FOREIGN PATENT DOCUMENTS

| | | | |
|---|---|---|---|
| 0721048 | 4/1942 | Fed. Rep. of Germany | 227/117 |
| 2235551 | 1/1974 | Fed. Rep. of Germany | 227/120 |
| 8019193 | 7/1980 | Fed. Rep. of Germany | . |

Primary Examiner—Howard N. Goldberg
Assistant Examiner—T. Ross
Attorney, Agent, or Firm—Frank H. Foster

[57] ABSTRACT

An apparatus for feeding and positioning disks upon insulation or roofing membrane for attachment to a roof or deck by fasteners driven through the disks into the underlying layer. A support frame is provided with two wheels on only one side to avoid wrinkling a roofing membrane. A disk supply magazine supports a stack of disks. A separating and feeding structure supplies individual disks to an oblique chute which conveys them to a driving position which is laterally offset from the magazine. The disks are attracted by magnet into position upon a pair of resiliently bendable springs which are cantilevered from opposite edges of the bottom opening of the chute. Depending upon the characteristics of the disks, the separating and feeding apparatus is either a disk with a port which moves the lowermost disk of a stack into registration with the top opening of the chute, that it may drop down the chute or else includes two pairs of retractable fingers, an upper pair for supporting the stack while the lower pair is retracted to drop the disk down the chute.

3 Claims, 10 Drawing Figures

AUTOMATIC FASTENING MACHINE FOR ROOF AND DECK COVERINGS

TECHNICAL FIELD

This invention relates generally to machines for automating the attachment of a surface layer of sheet material, such as insulation or water impervious membrane, to a roof, deck or other underlying surface of a building structure. The surface layer is attached by means of washer-like plates or disks which are clamped against the surface layer by means of a fastener extending through the disks into the underlying layer. The invention more particulary relates to a machine carrying a supply of those disks and feeding single disks into a convenient position for attachment of the fasteners with a mechanized screwdriver.

BACKGROUND ART

A layer of sheet material, such as insulation or roofing membrane is commonly attached to a roof or deck or other large surface of a building structure by means of a series of spaced, fastener structures. Typically the fastener structures each consists of a washer-like disk with a fastener such as a screw or nail extending through the disk, the surface layer and into the underlying layer.

In a typical installation procedure, after the surface layer to be attached to the underlying layer is first laid out upon the underlying layer, a first person carrying a supply of the disks walks along and positions them at spaced intervals in the places where they are to be installed. A second person follows behind with a hammer and a supply of screws. The second person pounds the screw through the disk and the suface layer until it strikes the underlying layer. A third man follows the second with a power screwdriver or screw gun and drives the screws into the underlying layer to clamp each disk down against the surface layer and hold it against the underlying layer. This procedure requires several manual operations and therefore is both expensive and slow.

A currently available prior art machine which attempts to automate this procedure is an apparatus having four wheels so it can be pushed along on the surface layer. The screws are fed into the machine in a belt like a cartridge belt used with automatic machine guns. This prior art machine also has a revolving plate which receives a disk in an aperature of the plate and moves it to the position at which a screw driving mechanism attached to the machine installs a screw through the disk. The screwdriver and the revolving plate are synchronized by drive mechanisms so that the automatic screw driver passes through the aperature as it drives a screw through the disk.

In addition to the complexity, size and expense of the prior art device, one particular difficulty which has been experienced occurs when a need arises to remove a screw which did not attach correctly. Occasionally it becomes necessary to back off such a screw with the screwdriver mechanism to remove it. Unfortunately, however, the synchronized drive mechanism attempts to return the revolving plate back to receive another disk as the screwdriver is backed off causing the screwdriver and the plate to interfere and resulting in damage to the plate. Such plates are expensive to replace and such a failure in the equipment causes a substantial time delay for replacement.

There is, therefore, a need for an automatic fastening machine which can position the disks securely and reliably in a position which is both away from potential interference with moving mechanisms and suitable for application of an automatic screw gun to the screw.

Yet another difficulty with machines of this type arises when they are used to apply a roofing membrane and are rolled along the membrane from one fastener position to the next. The action of the wheels upon the membrane causes the membrane to gather and wrinkle. There is, therefore, a need for an automatic fastening machine which can be easily transported along a membrane from each fastener position to the next fastener position without causing such wrinkling.

Yet another disadvantage which arises with this prior art machine apparently occurs because of the need to push the fastener screw out of its carrying belt. In order to do that, the designers of the prior art machine designed it to use hexagonally headed screws. However, the philips head screw is conventional in the roofing industry. One major advantage of the present invention is that it can use philips head screws. It can also use a conventional stand-up screw gun and with slight size modifications any other automtic screw driver or even a manual screw system.

Yet another difficulty with the prior art machine is that it will not work with round disks or with disks with a deeply embossed pattern upon them for additional strength. There is, therefore, a need for an automatic fastening machine which can be utilized with any of the disks which are conventionally available and requires only minor modification needed to the machine for accomodating the various disks.

BRIEF DISCLOSURE OF INVENTION

Embodiments of the invention have a support frame which is transported over the surface layer to the selected positions where the disk fasteners are to be attached. A disk supply magazine is mounted to the frame and includes means for separating and feeding individual disks. A disk guide means receives disks from the supply magazine and guides them to a driving position which is laterally offset from the magazine mechanisms and immediately above the surface layer. A fastener driver guide, which is preferably an opening in a plate immediately above the driving position of the disk, receives a stand-up screw gun or other driving apparatus.

Preferably, the disk guide means includes an oblique chute with cantilevered, resiliently bendable springs at the bottom opening of the chute forming releasable catches. The wheels are positioned on one side of the frame and do not extend substantially below its bottom so that the frame may be tilted, rolled to the next fastener position and then tilted back and laid flush against the surface layer for installation of the disk and fastener. Preferably, a magnet is positioned at the bottom of the chute to attract each ferromagnetic disk into proper driving position upon the catches.

A supply of disks are held in a vertical stack by a retaining means. They may be separated either by two sets of alternately retractable and extendable fingers or by skewing the stack from the top opening of the chute and rotating the lowermost disk into registration with the top of the chute so it may fall down into the driving position.

3

One of the advantages of the present invention is that the disks are moved laterally from the supply magazine so that not only may the fasteners be driven by a conventional screw gun or manually, but also so that the screwing mechanism and the feed mechanism can never interfere with each other. Positioning the wheels upon only one side of the frame permits the frame wheels to be rolled along near the edge, but not upon the membrane itself while the frame extends over the membrane. The apparatus may be tilted and rolled and then straightened for application of the disks and fasteners.

Other advantageous features which solve problems described above will be apparent from the following description.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

Figure 1:
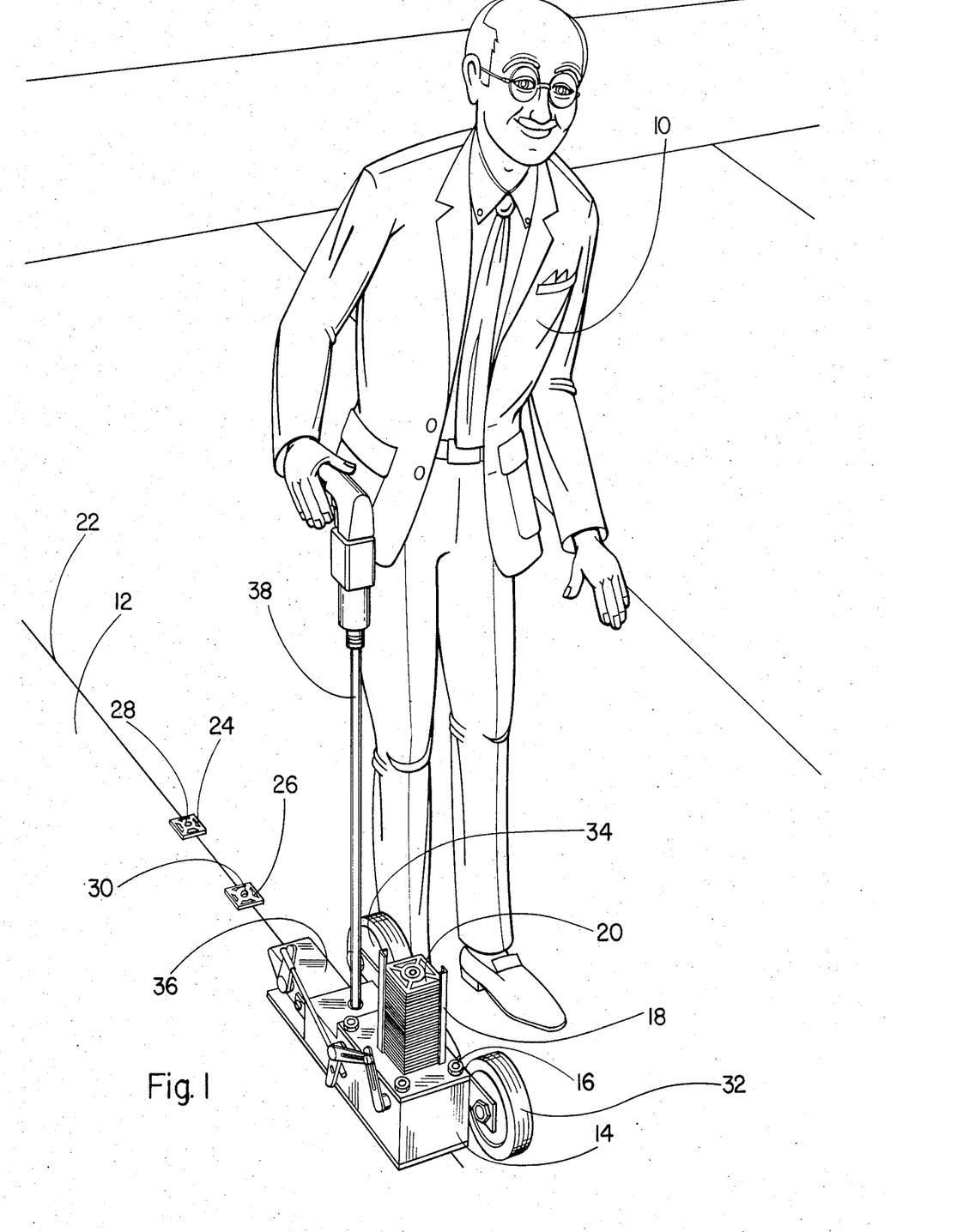
FIG. 1 is a view in perspective of a workman using an embodiment of the invention for applying a roofing membrane to a roof.

FIG. 1 illustrates a worker 10 applying disks and fasteners for attachment of a roofing membrane 12 to an underlying roof or deck by means of an embodiment 14 of the invention. The embodiment 14 has a support frame 16 which has a disk supply magazine, including a retaining means 18 for holding a vertical stack of disks 20. As described in more detail below, the preferred embodiment is rolled along the edge 22 of the roofing membrane 12 to apply disks and fasteners for holding down the membrane at spaced intervals along the edge. The membrane 12 is fastened by means of disks, such as disks 24 and 26, which are held against the membrane 12 by means of central fasteners 28 and 30.

The embodiment of FIG. 1 is rolled into position by tilting it, rolling it on the wheels 32 and 34 and then tilting it back so that the bottom surface of the support frame 14 rests upon the membrane 12. A foot pedal 36 is then depressed by the worker 10. Activation of the pedal 36 positions a disk within the support frame 14 in a driving position immediately below a conventional, stand-up screw gun 38.

The worker then drops a philips head screw into the screw gun and actuates the screw gun to drive the screw through the disk beneath it and into the underlying roof or deck.

FIGS. 6–10 illustrate in more detail the embodiment of the invention illustrated in FIG. 1. That embodiment is preferred for relatively thinner disks, for those with deep embossing and for round disks which have no corners.

Another embodiment is illustrated in FIGS. 2–5 and is preferred for other types of disks. It has a support frame 40 which is movable over a surface layer to the selected position on the surface layer, where disks and fasteners are desired, by means of a pair of longitudinally spaced wheels 42 and 44. The wheels 42 and 44 are journalled to a longitudinal bar 46 which is attached to the side of the support frame 40. The wheels 42 and 44 are both mounted on the same side of the frame and are aligned parallel to the travel direction of the frame. The lowermost periphery of those wheels does not extend significantly below the support frame 40 and preferably is mounted at a slightly higher level than the bottom surface 54 of the support frame 40. In this manner the frame may be laterally tilted, wheeled longitudinally along the edge of a membrane so that the support frame doesn't touch the membrane and then tilted back and levelled so that the bottom 54 of the frame is resting upon the membrane itself.

Figure 2:
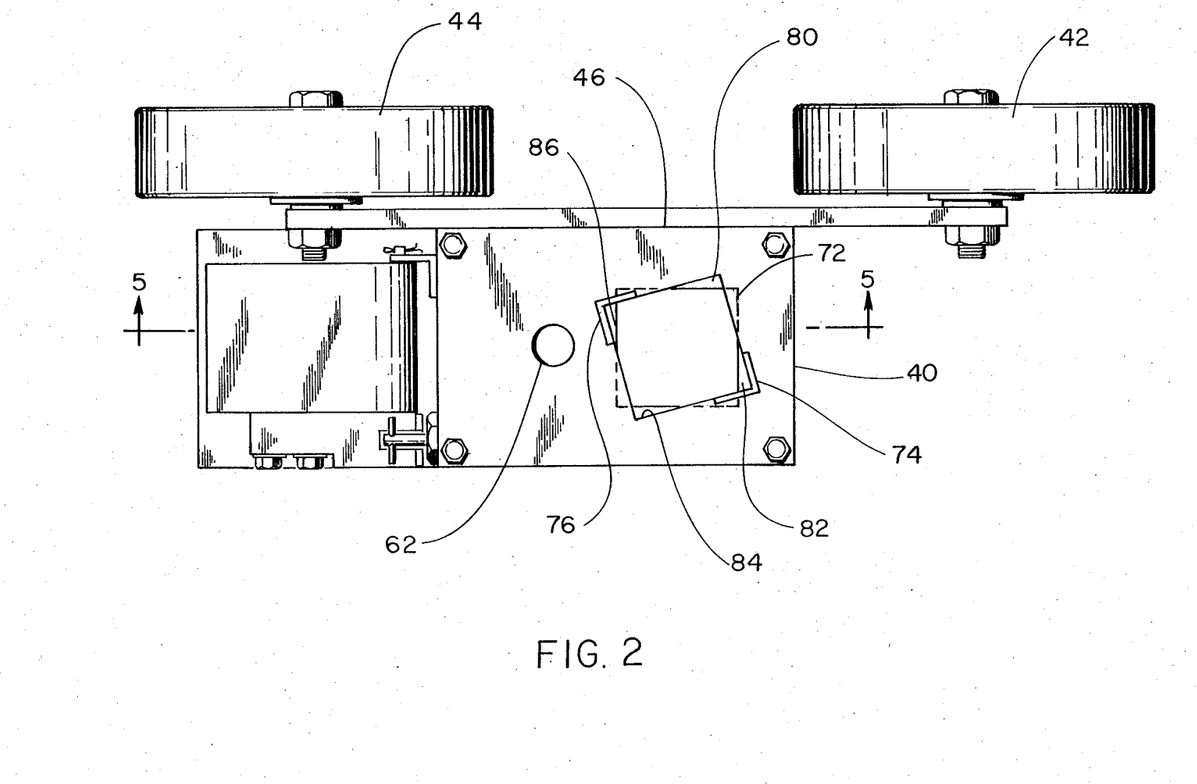
FIG. 2 is a top plan view of an embodiment of the invention in which the disks are supported askew of the top of the chute and the bottom one is rotated into position for dropping down the chute.
Figure 3:
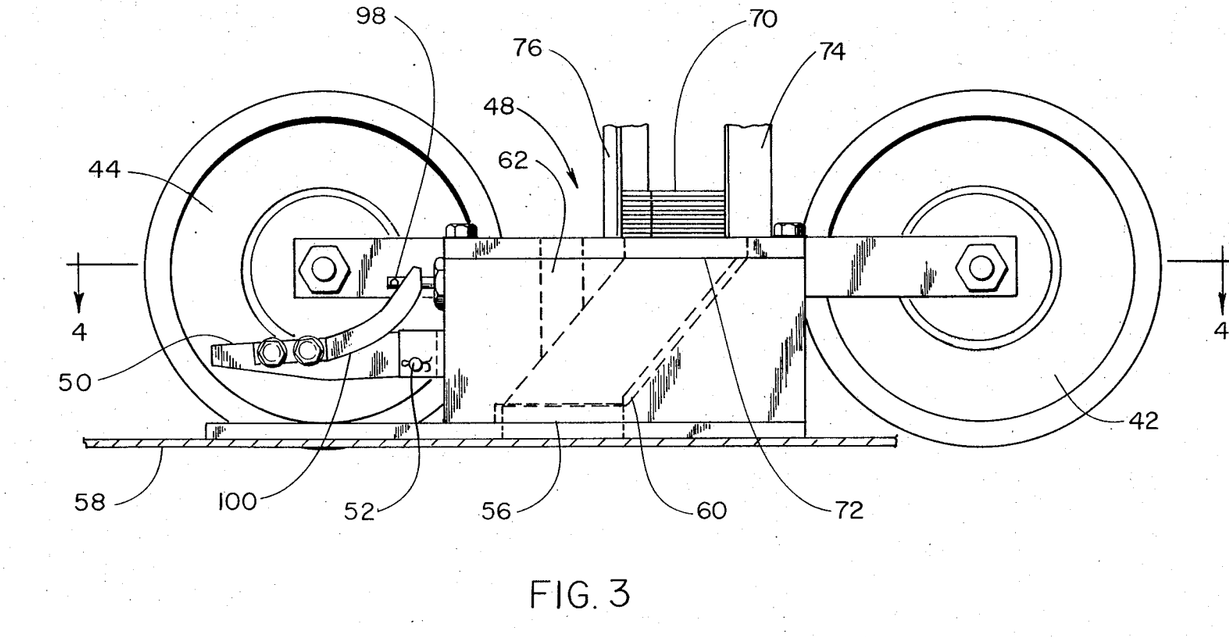
FIG. 3 is a view in side elevation of the embodiment of FIG. 2.

A disk supply magazine 48 is mounted to the frame and include means for separating and feeding the individual disks in response to activation by a foot pedal 50, pivotally mounted to the support frame 42 at a pivot axis 52.

Located immediately beneath the disk supply magazine is a disk guide means for receiving disks from the magazine and guiding them to a driving position 56 immediately above the surface layer 58. The disk guide means includes an oblique chute 60 which is formed within the support frame 40 and extends from beneath the disk supply magazine 48 to beneath a driver guide 62. The chute 60 opens downwardly onto the surface layer 58 and is illustrated in more detail in connection with the embodiment of FIGS. 6–8.

An important feature of the present invention is the fact that the chute guides the disk to a position which is laterally offset from the supply magazine 68 so that the driver guide 62 may also be laterally offset and there is no interference between any mechanisms of the embodiment and a screw driving mechanism.

The preferred driver guide 62 is simply a hole through the support frame 40 and aligned on the central axis of the opening at the bottom of the chute 60. The inside diameter of the hole 62 is selected to matingly receive the lower end of the screw drivers, such as the stand-up screw gun 38 illustrated in FIG. 1. This diameter may be selected to accomodate whatever screw driver is derived for use with the embodiment of the invention.

The preferred retaining means for holding a supply of disks in a vertical stack 70 extending upwardly from the top opening 72 of the chute 60 consists of a pair of right angle bar stock arms 74 and 76 which hold the stack in position and guide the disks to the proper position for separation.

Figure 4:
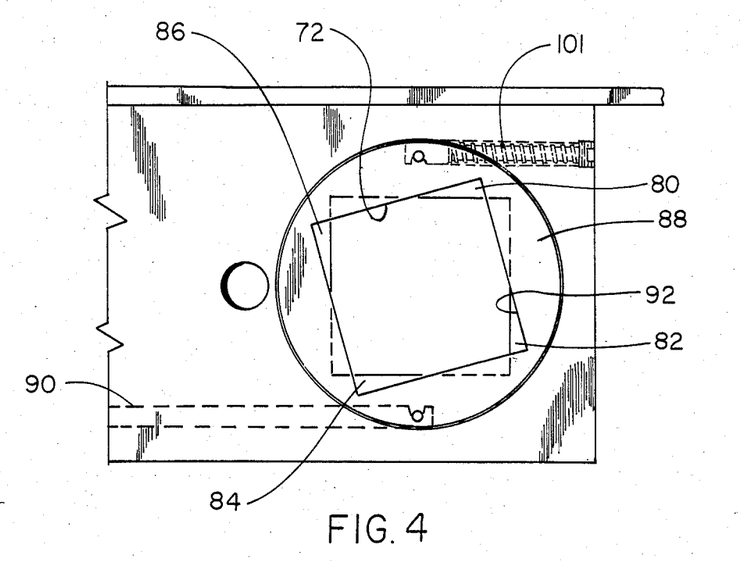
FIG. 4 is an enlarged view of a portion of the interior working mechanisms of the embodiment of FIG. 2.
Figure 5:
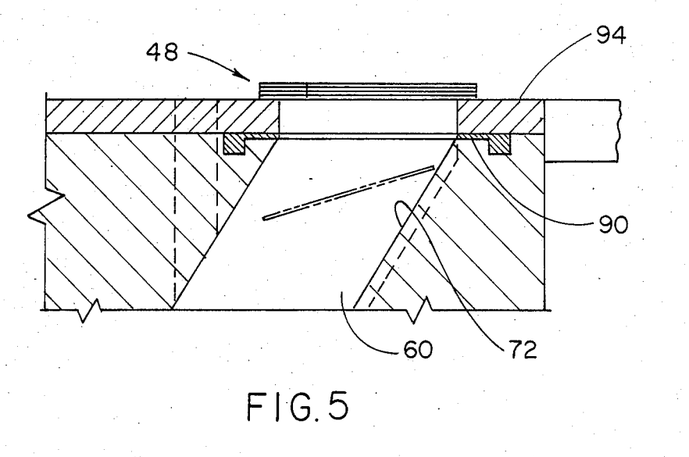
FIG. 5 is a view in vertical section taken substantially along the lines 5—5 of FIG. 3 illustrating the mechanism of FIG. 4.
Figure 6:
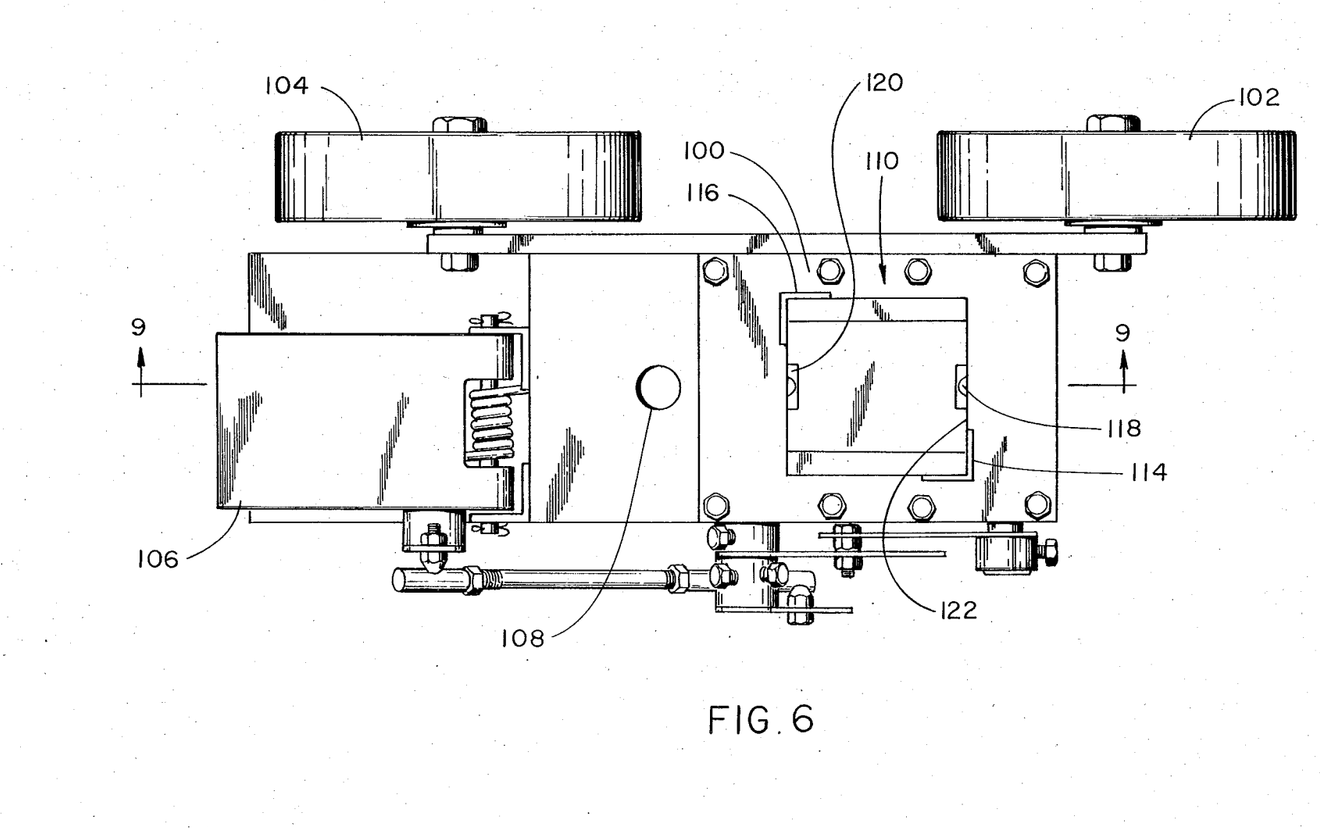
FIG. 6 is a top plan view of an alternative embodiment of the invention.
Figure 7:
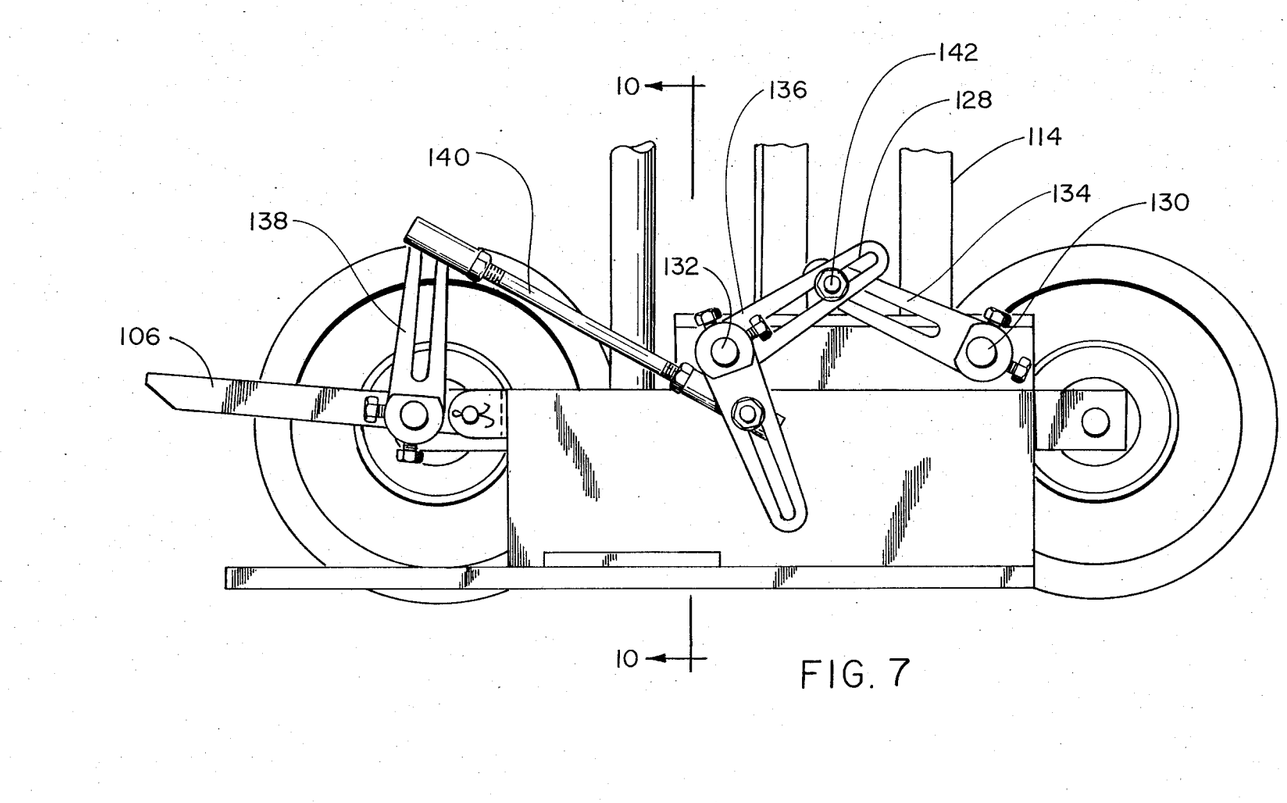
FIG. 7 is a view in side elevation of the embodiment of FIG. 6.
Figure 8:
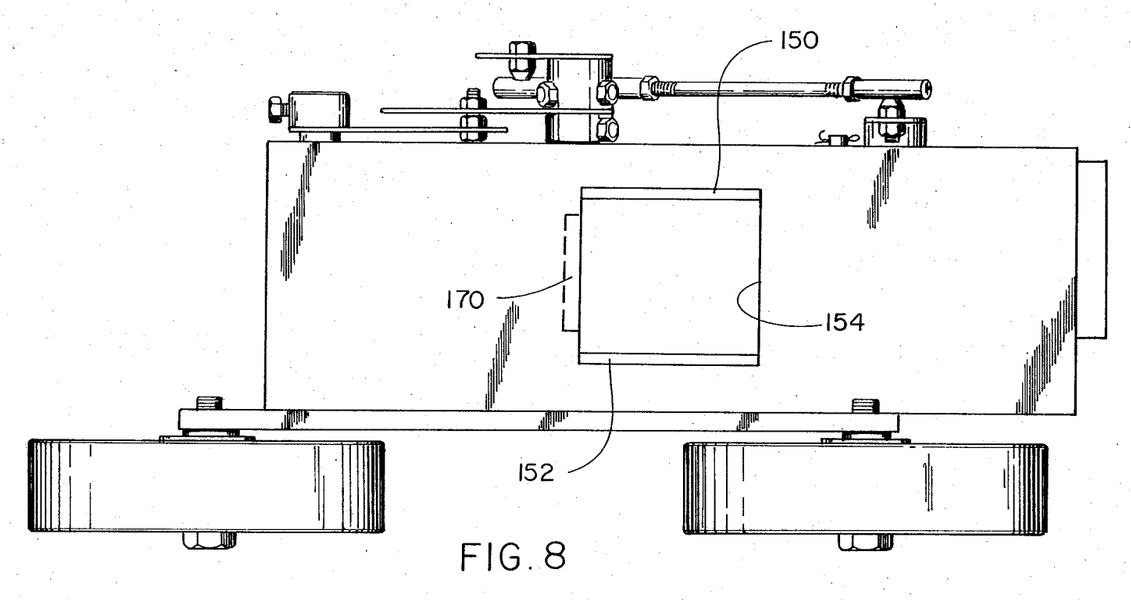
FIG. 8 is a bottom view of the embodiment of FIG. 6.

As shown most clearly in FIGS. 2 and 4 the retaining arms 74 and 76 are positioned so that the stack of disks 70 is coaxial with the top 72 of the chute 60, but is skewed from it, preferably by being angularly rotated from alignment with the top opening 72. This permits the corner edges of the stack of disks 70 to rest upon the top edges of the top of the chute in the four regions 80, 82, 84 and 86. A generally circular, horizontal plate 88 is seated for pivotal movement in a mating cavity 90 formed about the top of the chute 60 and free to pivot about the central axis of the chute and the stack. This plate 88 has a central port for matingly but loosely surrounding the periphery of a disk and is of a thickness not greater than the thickness of each disk. This port 92 is normally in alignment with the stack 70 of the disks and the lowermost disk rest within that port. Immediately above the disk 91 is the top plate 94 of the support frame to which the upwardly extending retaining arms 74 and 76 are attached.

The plate 88 is connected by a linking rod 98 to an arm 100 which is fixed to the pedal 50. The pedal is resiliently biased to its upward position by a spring 101 and upon depression by the foot of the operator pivots downwardly to translate the connecting arm 98 longitudinally and thereby cause the plate 88 to pivot until its port 92 is in alignment with the top opening 72 of the chute 60. This rotates the lowermost disk of the stack into alignment with the chute and permits it to fall downwardly through the chute.

In order to accomodate disks which cannot be rotated because of deep embossing or which are not polygons, but rather are round and therefore have no corners, the separating and feeding means disclosed in FIGS. 6-10 may be utilized. Referring to FIGS. 6-10, that embodiment also has a support frame 100 with similarly positioned wheels 102 and 104. It further has an actuator pedal 106 which is resiliently, upwardly biased and a fastener driver guide 108 laterally offset from its disk supply magazine 110. It similarly has a disk conveying means, including a chute 112 for conveying the disks to a driving position which is laterally offset from the magazine mechanism, immediately above the surface layer and beneath the fastener driver guide 108, all in the manner described above. The retaining means has upstanding arms 114 and 116 as described above, but they align the disks in vertical alignment with and directly above the top opening of the chute. However, the stack of disks is supported by a pair of lower, retractable fingers 118 and 120 which normally extend inwardly from opposite sides of the top opening 122 of the chute 112.

Figure 9:
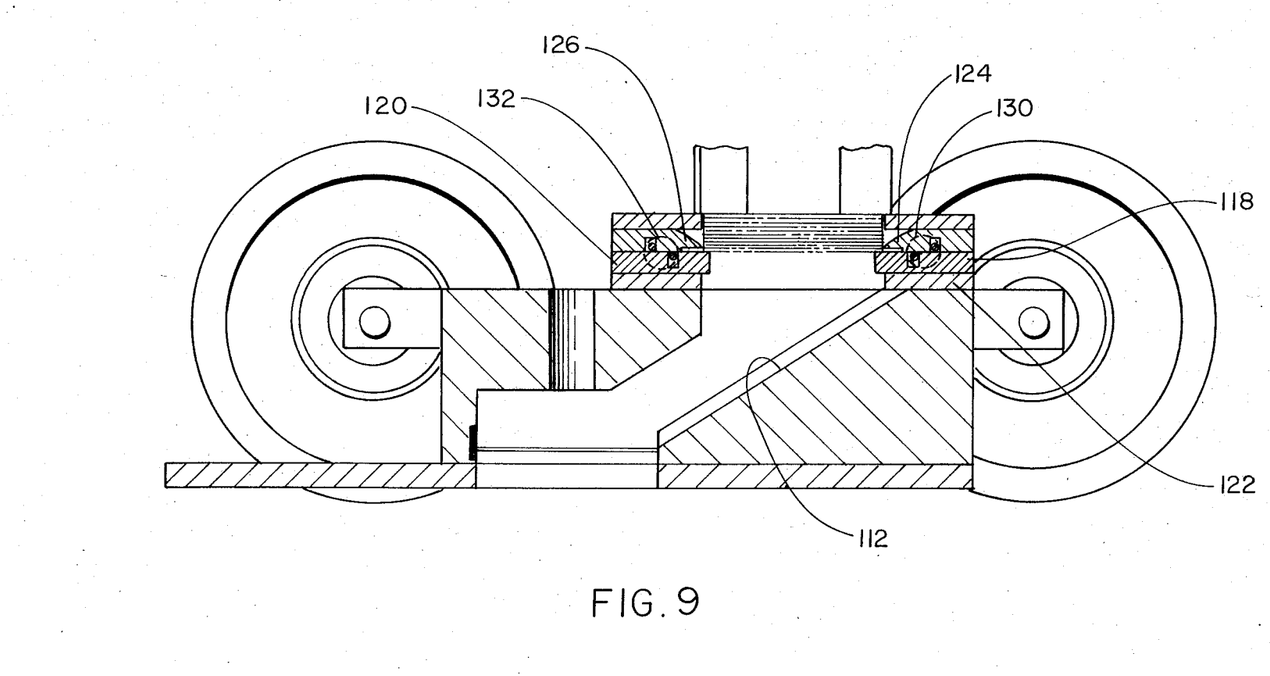
FIG. 9 is a view in vertical section taken substantially along the line 9—9 of FIG. 6 of a segment of the embodiment of FIG. 6 illustrating the details of the separating mechanism of the embodiment of FIG. 6.

A pair of normally retracted, extendible, upper fingers 124 and 126 are positioned on opposite sides of the top opening of the chute, preferably immediately above the lower fingers. They are spaced above the lower fingers 118 and 120 by a distance substantially equal and preferably slightly more than the thickness of each disk. They are sufficiently thin at their inward edges and preferably tapered as illustrated so that they may extend outwardly and be inserted between the lowermost disk and the stack of disks above it.

A synchronized drive means 128 is connected from the activator pedal 106 to the fingers so that upon depression of the pedal 106 the upper fingers 124 and 126 are extended to support the stack and the lower fingers 118 and 120 are retracted to permit the lowermost disk to drop down the chute. The fingers are then returned to their normal position upon release of the activator pedal.

The preferred separator drive finger mechanism is a pair of pivotal rods 130 and 132 which extend between the fingers and upon rotation extends one and retracts the other. In the region of the fingers, the rods 130 and 132 each narrow down to a pair of small pins which pass through small slots in the fingers. The rod 130 is attached to a lever arm 134, while the rod 132 is attached to a bell crank 135. The pedal 106 has a protruding arm 138 connected to it which in turn is pivotally connected through a linkage 140 to the bell crank 136. Depression of the pedal 106 causes the bell crank 136 to be rotated, clockwise in FIG. 7, to pivot the rod 132 and thereby cause the lower finger 120 to be withdrawn and the upper finger 126 to be extended. Simultaneously, rotation of the bell crank 136 causes the pivot slide 142 to pivot the lever arm 134, in a counterclockwise direction in FIG. 7, to similarly rotate the rod 130 and cause the upper finger 124 to extend and the lower finger 118 to be withdrawn. Of course, a multitude of alternative linkage mechanisms which are well known to those skilled in the art may be substituted so that depression of an actuator causes the above described movement of the fingers.

Figure 10:
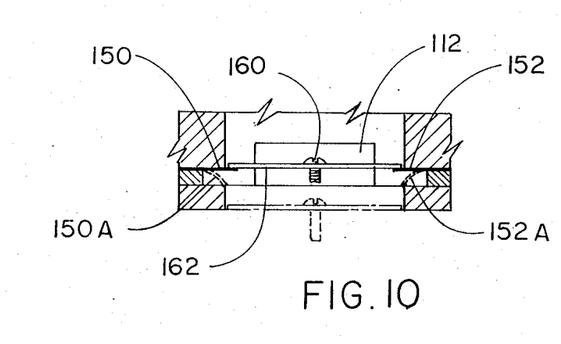
FIG. 10 is a view in vertical section taken substantially along the line 10—10 of FIG. 7 and illustrating the catch mechanism at the bottom of the chute in the preferred embodiments of the invention.

It is, of course, desirable that every disk which is dropped down the chute be positioned in a reliably, repeatable driving position so that the central opening in the disk is positioned immediately below the fatener driver guide 106. In order to accomplish this a pair of resiliently, separable catches 150 and 152 are mounted to extend inwardly from opposite sides of the bottom opening 154 of the chute 112. These are illustrated in most detail in FIGS. 8 and 10 and the structure at the bottom of the chute 112 is also utilized at the bottom of the chute 60 of the embodiment illustrated in FIGS. 2-5. Preferably, the separable catches 150 and 152 each comprises a resiliently bendable ribbon of stainless, spring steel which is cantilevered from an edge of the bottom opening 154 and positioned immediately above the surface layer. These springs releasably retain a disk in position for being driven downwardly by a fastener applied by the standup screw gun inserted through the hole 108. As illustrated in FIG. 10 the screw 160 is inserted through the disk 162 and as it is rotated and driven into the underlying layer, the resiliently separable catches 150 and 152 are deformed downwardly to the positions 150A and 152A. Upon the application of sufficient force the disk 162 is pulled past the catches 150 and 152 and against the surface layer.

Preferably, a permanent magnet 180 is mounted in a suitable cavity at the bottom forward edge of the chute 112 for attracting ferromagnetic disks into position upon the catches 150 and 152. A corresponding permanent magnet is also used on the other embodiment.

While certain preferred embodiments of the present invention have been disclosed in detail, it is to be understood that various modifications may be adopted without departing from the spirit of the invention or scope of the following claims.

I claim:

1. An apparatus for feeding and positioning disks upon a surface layer of material and beneath a fastener driver guide for attaching the surface layer against an underlayer by fasteners driven through said disks into the underlayer, the apparatus comprising:
- (a) a support frame for movement over said surface layer to the selected positions on the surface layer where disks and fasteners are desired;
- (b) a disk supply magazine mounted to said frame and including means for separating and feeding individual disks in response to activation, the disk supply magazine including a retaining means for holding a supply of disks in a vertical stack extending upwardly from the top opening of an oblique chute to prevent lateral movement of all but the lowermost disk of the stack, said retaining means being skewed from the top opening of the chute so that edges of the lowermost disk rest upon edges of the top opening of the chute, the disk supply magazine also including a movable substantially horizontal plate below said retaining means and having a thickness not greater than the thickness of each of said disks and having a port for matingly surrounding the periphery of the lowermost disk, said plate being movable to move said port between a position at the bottom of said stack around the lowermost disk and a position in alignment with the top of said chute, wherein the stack retaining means, the port in the conveying plate and the top opening of the chute are vertically coaxial, the retaining means holding the supply of disks angularly rotated from alignment with the top opening of the chute and wherein said plate is pivotal about said vertical axis for rotating the lowermost disk from the stack into alignment with the chute;
- (c) disk guide means for receiving disks from said supply magazine and guiding them to a driving position which is laterally offset from said supply magazine and immediately above said surface layer, said disk guide means including said oblique chute extending from beneath said magazine to beneath said drive guide and opening downwardly onto said surface layer, said disk guide means further including resilient movable catches extending inwardly from opposite sides of the lower portion of said chute and above the surface layer for releasably retaining one of said disks in position for being driven downwardly by a fastener against the surface layer, each of said catches including a resiliently bendable spring which is cantilevered from an edge of the lower portion of said chute, the disk guide means further including a permanent magnet mounted near the lower end of said chute, for attracting one of said ferromagnetic disks into position upon said catches;
- (d) a fastener driver guide laterally offset from said magazine and above said driving position said guide including a plate mounted to said frame and having a vertical hole aligned with the central axis of the bottom opening of said chute; and
- (e) a pair of spaced wheels both mounted to the same side of said frame laterally with respect to the travel direction, each wheel aligned parallel to the travel direction, the lowermost periphery of the wheels not extending significantly below the bottom of said support frame so that said frame may be laterally tilted, wheeled longitudinally and levelled with the bottom of said frame substantially resting upon said surface layer.

2. An apparatus for feeding and positioning disks upon a surface layer of material and beneath a fastener driver guide for attaching the surface layer against an underlayer by fasteners driven through said disks into the underlayer, the apparatus comprising:
- (a) a support frame for movement over said surface layer to the selected positions on the surface layer where disks and fasteners are desired;
- (b) a disk supply magazine mounted to said frame and including means for separating and feeding individual disks in response to activation, the disk supply magazine including a retaining means for holding a supply of disks in a vertical stack extending upwardly from the top opening of an oblique chute to prevent lateral movement of all but the lowermost disk of the stack, said retaining means being skewed from the top opening of the chute so that edges of the lowermost disk rest upon edges of the top opening of the chute, the disk supply magazine also including a movable substantially horizontal plate below said retaining means and having a thickness not greater than the thickness of each of said disks and having a port for matingly surrounding the periphery of the lowermost disk, said plate being movable to move said port between a position at the bottom of said stack around the lowermost disk and a position in alignment with the top of said chute, wherein the stack retaining means, the port in the conveying plate and the top opening of the chute are vertically coaxial, the retaining means holding the supply of disks angularly rotated from alignment with the top opening of the chute and wherein said plate is pivotal about said vertical axis for rotating the lowermost disk from the stack into alignment with the chute;
- (c) disk guide means for receiving disks from said supply magazine and guiding them to a driving position which is laterally offset from said supply magazine and immediately above said surface layer, said disk guide means including said oblique chute extending from beneath said magazine to beneath said drive guide and opening downwardly onto said surface layer, said disk guide means further including resilient movable catches extending inwardly from opposite sides of the lower portion of said chute and above the surface layer for releasably retaining one of said disks in position for being driven downwardly by a fastener against the surface layer;
- (d) a fastener driver guide laterally offset from said magazine and above said driving position said guide including a plate mounted to said frame and having a vertical hole aligned with the central axis of the bottom opening of said chute; and
- (e) a pair of spaced wheels both mounted to the same side of said frame laterally with respect to the travel direction, each wheel aligned parallel to the travel direction, the lowermost periphery of the wheels not extending significantly below the bottom of said support frame so that said frame may be laterally tilted, wheeled longitudinally and levelled with the bottom of said frame substantially resting upon said surface layer.

3. An apparatus for feeding and postitioning disks upon a surface layer of material and beneath a fastener driver guide for attaching the surface layer against an underlayer by fasteners driven through said disks into the underlayer, the apparatus comprising:

(a) A support frame for movement over said surface layer to the selected positions on the surface layer where disks and fasteners are desired;

(b) a disk supply magazine mounted to said frame and including means for separating and feeding individual disks in response to activation the disk supply magazine including a retaining means for holding a supply of disks in a vertical stack aligned with and directly above the top opening of an oblique chute, the separating and feeding means including a pair of lower, retractable, fingers normally extending inwardly from opposite sides of the top opening of the chute and a pair of upper, extendable, normally retracted fingers on opposite sides of the top opening of the chute, the normally retracted fingers being spaced above the lower fingers by a distance which is substantially equal to the thickness of each disk, the normally retracted fingers also being sufficiently thin to slide between the lowermost disk and the stack of disks above the lowermost disk, said separating and feeding means also including a coordinating drive means connecting an activator to said fingers for extending the upper finger and retracting the lower fingers in response to activation to drop a disk down the chute and for extending the lower fingers and retracting the upper fingers in response to release of the activator;

(c) disk guide means for receiving disks from said supply magazine and guiding them to a driving position which is laterally offset from said supply magazine and immediately above said surface layer, said disk guide means including said oblique chute extending from beneath said magazine to beneath said drive guide and opening downwardly onto said surface layer, said disk guide means further including resilient catches extending inwardly from the opposite sides of the lower portion of said chute and above the surface layer for releasably retaining one of said disks in position for being driven downwardly by a fastener against the surface layer; and (d) a fastener driver guide laterally offset from said magazine and above said driving position.

* * * * *